May 3, 1927.
H. CLEMENT
1,626,601
OPTICAL DIAGNOSTIC INSTRUMENT
Filed July 15, 1925
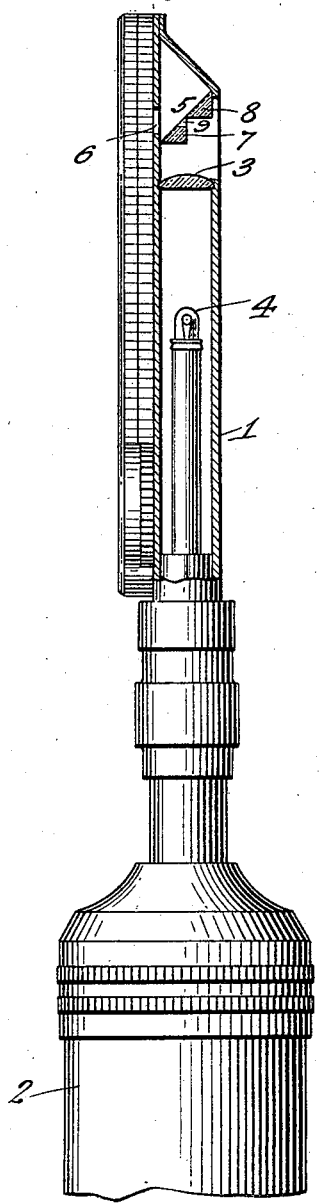
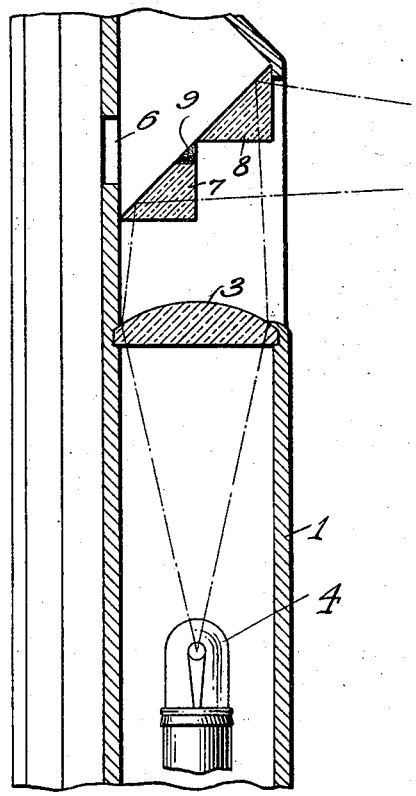
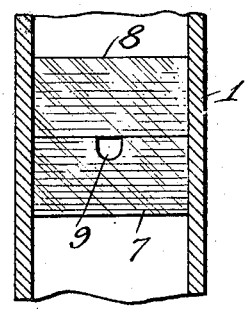
INVENTOR.
HANS CLEMENT
BY
*Stockbridge & Borst*
ATTORNEYS Patented May 3, 1927.

1,626,601

UNITED STATES PATENT OFFICE.

HANS CLEMENT, OF NEW YORK, N. Y., ASSIGNOR TO GENERAL OPTICAL CO., INC., A CORPORATION OF NEW YORK.

OPTICAL DIAGNOSTIC INSTRUMENT.

Application filed July 15, 1925. Serial No. 43,727.

My invention has especial reference to the reflectors employed in illuminated, optical diagnostic instruments, such as ophthalmoscopes. These are usually in the form of mirrors inclined 45° to the axis of the light and provided with a sight opening through which the observer looks in examining the illuminated area, such as the pupil of the patient's eye.

This sight opening often results in more or less interference with the reflection of the light and with the observer's vision. An unsilvered hole or spot in a plane glass mirror as a sight opening allows an objectionable illumination back of the reflecting plane and also some edge diffraction and reflection resulting in halo effects and lack of precision in the illuminated area. A narrow vertical slot in the upper part of the reflector substantially avoids the halo effects characteristic of the central round observation hole, but the lessened illumination of the area observed due to the slot in the reflector is quite pronounced, and so the slot substantially detracts from the efficiency of the instrument.

By my invention I am able to employ merely a small central sight opening in the reflector and thus deprive the reflector of a minimum area of reflecting surface, and at the same time I am able to avoid the objectionable halo effects due to refraction and reflection of the light about the edge of the sight opening. Moreover, my invention enables me to eliminate or reduce to a negligible minimum the passage of direct rays through the sight opening back of the reflector.

In accordance with my invention I make the reflector in two parts dividing on a more or less central horizontal line, and the upper edge of the lower member is in the form of an acute angle. An acceptable form for this reflector is a right angle triangle prism with the hypotenuse as the reflecting surface. In the upper angular edge is a slot forming the sight opening, and the walls of this slot may be coated with an opaque material, thus excluding the light from the sight opening. Due to the angular shape of the side walls of the slot no shadow is thrown on the upper reflecting surface above the sight opening, as would be the case if the opaque coating for the sight opening were in the form of a cylinder. In order to avoid refraction of the light on the lower surface of the upper member where it forms in effect the top of the sight opening, and thus interfere with the clear vision of the spot illuminated by the reflected light, this lower surface may be polished. In fact the upper member may also be a right angle triangle prism disposed so that its hypotenuse is the reflecting surface and cooperates with that of the lower member.

I shall now describe the illustrated embodiment of my invention and shall thereafter point out my invention in claims.

Fig. 1 is a partial elevation and partial section of an ophthalmoscope containing an embodiment of my invention.

Fig. 2 is an enlarged sectional elevation of the upper part of the objection tube and contained parts.

Fig. 3 is a rear elevation of the reflector as mounted in the tube which is shown in section.

The objective tube 1 of the ophthalmoscope is mounted on the battery-containing handle 2 in the usual way, and has at its upper end an objective lens 3. An electric lamp 4 within the tube serves as the source of light. The means whereby the lamp and objective lens are relatively adjustable to vary the distance between them is not shown, since such means are common and form no part of the present invention. A reflector 5 is mounted above the objective lens 3 in line with a sight opening 6 in the casing.

This reflector 5 in the form illustrated consists of two total reflecting prisms 7 and 8, the hypotenuse of the two prisms being silvered and forming a single reflecting plane, which is at an angle of substantially 45° to the axis of the lens 3, so as to reflect the light at substantially an angle of 90° to the incident rays.

In substantially the center of the top edge of the prism 7 is a slot 9 forming an observation opening. The walls of this slot are coated with a suitable opaque and non-reflective material, such as dead black lacquer or thin sheet metal shaped to conform to the groove.

Since the sides of the prisms are highly polished, there will be no appreciable refraction of the light rays by the base or lower surface of the prism 8, and there will, therefore, be no more halo effect at the top of the slot 9 than there is about its coated side and bottom walls. It is obvious that the hypotenuse of the prism 8 need not of necessity be the same plane as that of the prism 7, the only requisite being that the two prisms be so arranged that direct light will not pass between them behind the reflecting surface. It is also obvious that the reflecting members may be of other shape than prismatic and that other modifications may be made in the construction shown in the drawings and particularly described within the principle and scope of my invention.

I claim:

1. In an optical diagnostic instrument, in combination with a light source and a lens, a reflector for the light comprising two reflecting prisms with the hypotenii oblique to the axis of the lens and cooperative to form a plane reflecting surface, the prism nearer the lens having a slot for a sight opening in the solid angle farthest from the lens.

2. In an optical diagnostic instrument, in combination with a light source and a lens, a reflector for the light comprising two reflecting prisms with the hypotenii oblique to the axis of the lens and cooperative to form a plane reflecting surface, the prism nearer the lens having a slot for a sight opening in the solid angle thereof farthest from the lens, and an opaque coating for the slot.

3. In an optical diagnostic instrument, in combination with a light source and a lens, a reflector for the light comprising two reflecting prisms with the hypotenii forming a single reflecting plane oblique to the axis of the lens, the prism nearer the lens having a slot for a sight opening in the solid angle thereof farthest from the lens.

4. In an optical diagnostic instrument, in combination with a light source, a reflector for the light comprising a silvered glass member having a hole therethrough and the walls of the hole covered with an opaque material.

5. In an optical diagnostic instrument, in combination with a light source, a reflector for the light divided horizontally into two parts, the lower member having a slot in its upper edge forming a sight opening and the upper member having its lower surface polished.

6. In an optical diagnostic instrument, in combination with a light source, a reflector for the light divided horizontally into two parts, the lower member having a slot in its upper edge forming a sight opening and the upper member having its lower surface polished, and an opaque coating for the slot.

7. In an optical diagnostic instrument, in combination with a light source, a reflector for the light divided horizontally into two parts and arranged obliquely to the axis of the light, the lower part of the reflector having for its upper edge an acute solid angle with a slot therein forming a sight opening, and an opaque coating in the slot.

8. In an optical diagnostic instrument, in combination with a light source, a reflector for the light divided horizontally into two parts and arranged obliquely to the axis of the light, the lower part of the reflector having for its upper edge an acute solid angle with a slot therein forming a sight opening and the upper part of the reflector having its lower surface polished, and an opaque coating in the slot.

9. In an optical diagnostic instrument, the combination of a light source, a condensing lens and a single reflecting surface comprising a stepped total reflecting prism, a median sight opening therethrough and an opaque non-reflecting lining therein.

In witness whereof I hereunto subscribe my signature.

HANS CLEMENT.